(12) United States Patent
Chatterjee et al.

(10) Patent No.: US 11,341,090 B2
(45) Date of Patent: May 24, 2022

(54) SEAMLESS DATA MOVEMENT AND METADATA MANAGEMENT IN A HYBRID CLOUD SETTING USING A CONFIGURABLE MICRO SERVICES BASED ARCHITECTURE

(71) Applicant: AMERICAN EXPRESS TRAVEL RELATED SERVICES COMPANY, INC., New York, NY (US)

(72) Inventors: Arindam Chatterjee, Scottsdale, AZ (US); Pratyush Kotturu, Newark, NJ (US); Pratap Singh Rathore, Phoenix, AZ (US); Brian C. Rosenfield, Mukilteo, WA (US); Nitish Sharma, SCottsdale, AZ (US); Swatee Singh, Scottsdale, AZ (US); Mohammad Torkzahrani, Hoboken, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 56 days.

(21) Appl. No.: 16/583,846

(22) Filed: Sep. 26, 2019

(65) Prior Publication Data
US 2021/0097020 A1 Apr. 1, 2021

(51) Int. Cl.
G06F 16/11 (2019.01)
G06F 16/38 (2019.01)
G06F 16/182 (2019.01)
G06F 16/14 (2019.01)

(52) U.S. Cl.
CPC .......... *G06F 16/119* (2019.01); *G06F 16/148* (2019.01); *G06F 16/1824* (2019.01); *G06F 16/38* (2019.01)

(58) Field of Classification Search
CPC .... G06F 16/119; G06F 16/38; G06F 16/1824; G06F 16/148
See application file for complete search history.

(56) References Cited

U.S. PATENT DOCUMENTS

| | | | |
|---|---|---|---|
| 11,016,946 B1* | 5/2021 | Graham | G06F 16/289 |
| 2015/0095308 A1* | 4/2015 | Kornacker | G06F 16/24534 707/718 |
| 2017/0374151 A1* | 12/2017 | Moorthi | H04L 67/1097 |
| 2019/0332802 A1* | 10/2019 | Barday | G06F 21/6245 |
| 2020/0117543 A1* | 4/2020 | Zhang | G06F 3/0643 |
| 2020/0117824 A1* | 4/2020 | Upadhyay | G06F 16/221 |
| 2020/0241967 A1* | 7/2020 | Dain | G06F 11/1435 |

* cited by examiner

*Primary Examiner* — William E. Baughman
*Assistant Examiner* — Janice M. Girouard
(74) *Attorney, Agent, or Firm* — Thomas | Horstemeyer, LLP

(57) ABSTRACT

A system for data migration is disclosed. The system may receive a migration request comprising a source file path and a target file location. The system may capture source file metadata based on the source file path and the migration request. The system may transfer a source file from a first data environment to an intermediate data environment via a first transfer process. The system may transfer the source file from the intermediate data environment to a second data environment via a second transfer process.

20 Claims, 5 Drawing Sheets

SEAMLESS DATA MOVEMENT AND METADATA MANAGEMENT IN A HYBRID CLOUD SETTING USING A CONFIGURABLE MICRO SERVICES BASED ARCHITECTURE

FIELD

The present disclosure generally relates to systems and methods for migrating data between data environments.

BACKGROUND

Traditional methods of data management typically rely on multiple on-site and off-site data environments and cloud environments. A technical problem exists in that differing data environments tend to comprise a variety of formats, interfaces, securities, and transfer protocols. Therefore, data movements between environments may encounter conflicting protocols and may be further complicated by ad-hoc user requirements. Furthermore, errors may be introduced in data transfers between environments which may not be reported or captured. In this regard, electronic data migration and analysis by traditional methods may be time consuming, may demand a relatively large number of user inputs, and may be intolerant of informational faults.

SUMMARY

In various embodiments, systems, methods, and articles of manufacture (collectively, the "system") for data migration are disclosed. The system may receive a migration request comprising a source file path and a target file location. The system may capture source file metadata based on the source file path and the migration request. The system may transfer a source file from a first data environment to an intermediate data environment via a first transfer process. The system may transfer the source file from the intermediate data environment to a second data environment via a second transfer process.

In various embodiments, the system may generate a parquet file set based on the target file location. The system may generate a native agent instruction set based on the source file metadata. The system may conduct a schedule of operations based on the native agent instruction set via a native agent of the first data environment. In various embodiments, the system may search the parquet file set for a sensitive data element and generating a message in response to the sensitive data element. The system may receive an approval message and exiting a hold state. The system may update a status dashboard with at least one of a process status and a module status.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The systems and methods provide a greater level of sophistication and control for migration of data between data environments. Benefits of the present disclosure may apply to, for example, any sort of data environment. In that regard, the present disclosure may apply in structured data environments, unstructured data environments, data lakes, cloud storage environments and/or the like.

The current system provides a technical solution by enabling a common structure for data migration across a plurality of environments. The system may provide a variety of user access levels (e.g., permissions) associated with the plurality of environments. The system may increase the speed and efficiency of data processing and data migration. The system may reduce the process time a data migration process is engaged by a user or system. The system may also reduce redundant migration requests by decreasing migration errors, and thereby reducing a demand for system resources. The system may simplify data sorting, routing, and processing and enhance user experience by decreasing a number of user interactions. In various embodiments, the system may tend to enable enhanced data security and integrity by migrating data between a first data environment and a second data environment via an intermediate data environment. In this regard direct connections between the first and the second environment may be inhibited and leakage of sensitive data may be reduced.

The process also improves the functioning of the computer. For example, the process increases the reliability and speed of data migration by reducing the number of user inputs, by bypassing a number of user input requests and/or by enabling discrete reporting of migration process errors. Similarly, the process increases the reliability and speed of data presentation by enabling automated data migration and reporting. In various embodiments, the processes described herein may increase network availability by reducing front end and back end process calls and/or network hops and duplicate migration operations. The processes may also save processing resources including CPU time, memory resources, and network resources. In various embodiments, the system may convert source files into a compressed parquet format tending thereby to save network bandwidth during data transfer operations. The system may perform a sensitive element check on the compressed (parquet) file tending thereby to reduce data processing time. In like regard, the system may tend to increase available storage space by conducting operations on the parquet files thereby reducing data overhead. In various embodiments, the system may parallelize a number of jobs to service multiple requests tending thereby to maximize available bandwidth and increase data processing speeds.

Figure 1:
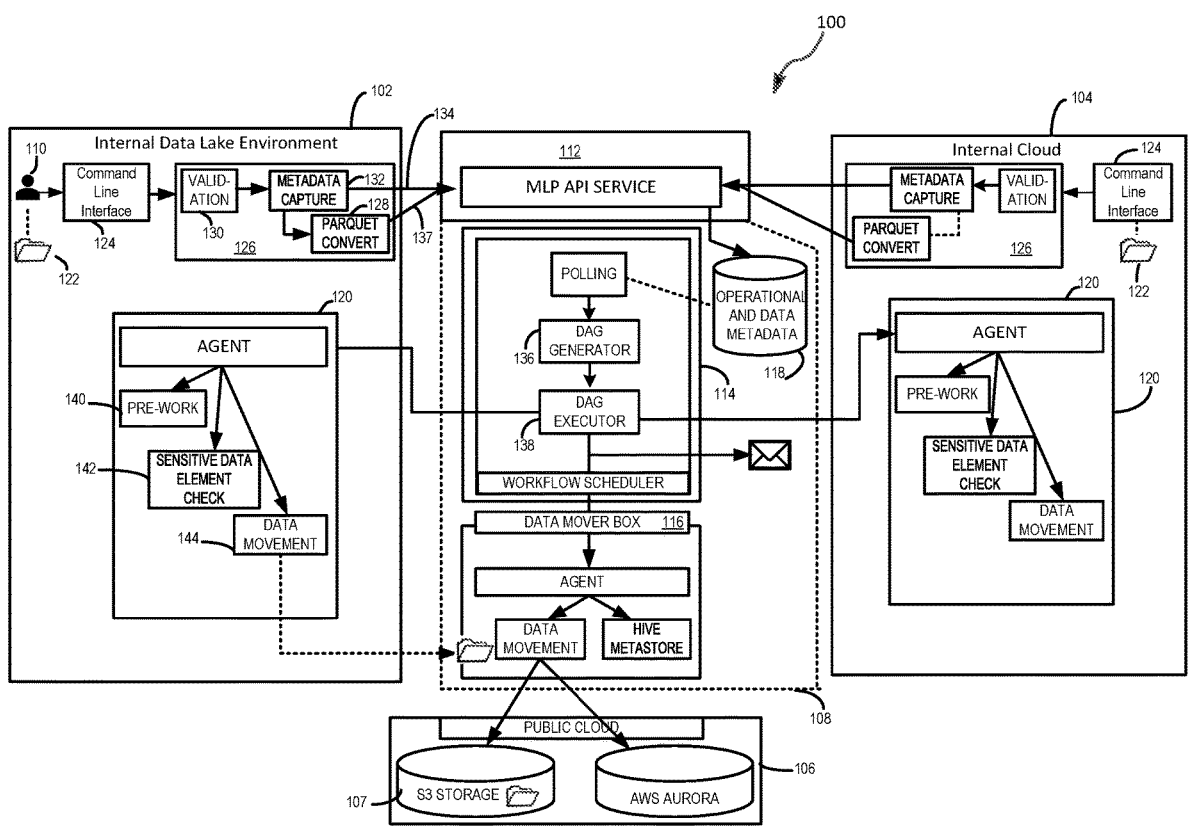
FIG. 1 is a block diagram illustrating various system components of a system for data migration, in accordance with various embodiments.

In various embodiments, and with reference to FIG. 1, a system 100 for data movement and metadata management may comprise a first data environment 102, a second data environment 104, an external data environment 106, and a migration service 108. Any of these components may be outsourced and/or be in communication with system 100 and migration service 108 via a network. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, migration service 108 may be configured as a central network element or hub to access various systems, engines, and components of system 100. Migration service 108 may comprise a network, computer-based system, and/or software components configured to provide an access point to various systems, engines, and components of system 100. Migration service 108 may be in operative and/or electronic communication with a user 110 via a user device. The migration service 108 may include a migration API service 112, a workflow scheduler 114, a data mover module 116, and a metadata database 118. In this regard, the migration service 108 may allow communication between the user 110 via the user device and the systems, engines, and components of system 100.

In various embodiments, a user device may comprise software and/or hardware in communication with the first data environment 102, the second data environment 104, and/or the migration service 108 via a network comprising hardware and/or software configured to allow a user, and/or the like, access to the migration service 108 and source data 122 (i.e., source file). The user device may comprise any suitable device that is configured to allow a user to communicate with a network and the migration service 108 via a command line interface 124. The user device may include, for example, a personal computer, personal digital assistant, cellular phone, kiosk, and/or the like and may allow a user to transmit command lines to the system 100.

In various embodiments, and as described in further detail herein, the first data environment 102 may comprise a data lake, e.g. large structures of data stored without regard to a common format. The second data environment 104 may comprise a cloud resource. Each of the data environments (102, 104) may be internal to a private network (i.e., an internal data environment), whereas the external data environment 106 may be widely accessible on a public network. The workflow scheduler 114 may be configured to generate and task native agents 120 of the data environments (102, 104). For example, the workflow scheduler may include a polling module configured to communicate with the metadata database 118, a Directed Acyclic Graph (DAG) generator module 135, and a DAG executor module 138. In like regard, the data environments (102, 104) may include native data processing modules 126 configured to communicate with the migration service 108 via the migration API service 112

In various embodiments, internal and external data environments (102, 104, 106) and the metadata database 118 may include any number of data structures or data elements. Metadata database 118 may be configured to maintain case type data such as, for example, migration service 108 status and source data 122 metadata such as, for example, number of columns transferred, size of files, file paths, data type, data structure, user information, and/or the like. In various embodiments, the native agents 120 may include modules particular to the data environment such as, for example, a pre work module 140, a sensitive data element check module 142, and a data movement module 144. In various embodiments and in like regard, the data mover box 116 may comprise one or more modules such as second data mover module and/or a hive metastore module. The second data mover module may be configured to communicate with the external data environment. The hive metastore module may be configured to communicate with a hive database of the external data environment.

Figure 2:
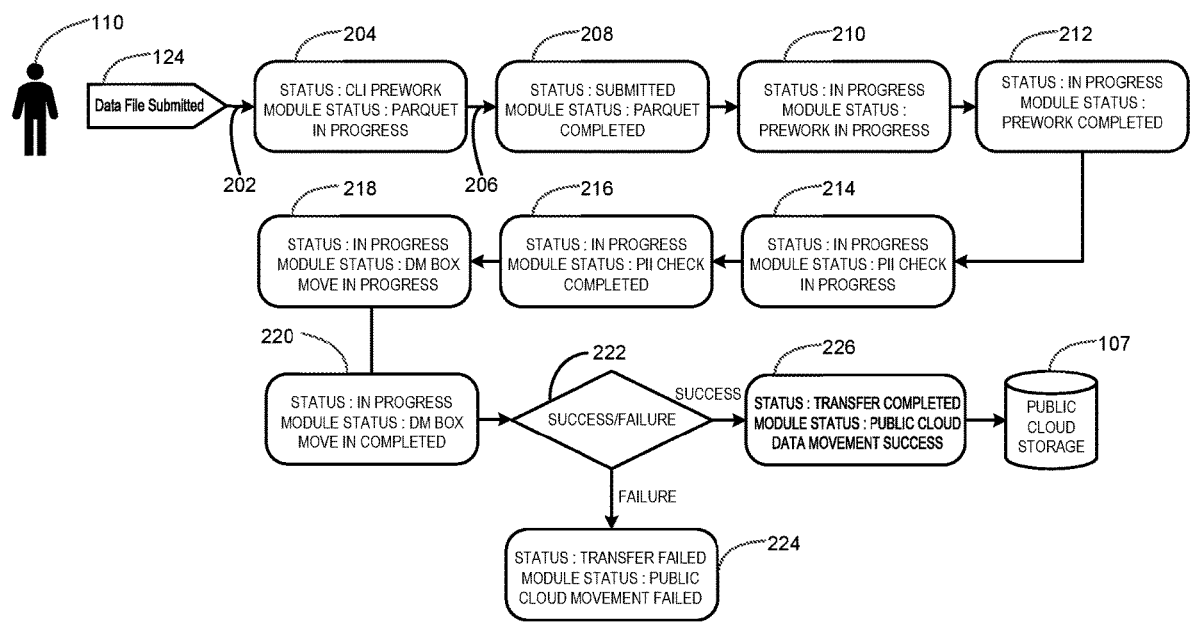
FIG. 2 illustrates a process for error monitoring and reporting in a system for data migration, in accordance with various embodiments.

With reference to FIG. 2, in various embodiments, a process 200 (e.g., in system 100) for error reporting is illustrated. The system may receive a migration request from user 110 via command line interface 124 (step 202). The migration request may include a source file 122 path and a target endpoint for the source file 122. In various embodiments, the source file and the endpoint may be in any of the data environments (102, 104, 106). In this regard, the system 100 may migrate data between in internal data environment (102, 104) to an external data environment 106 or vice versa. In response to the migration request, the system may start a native data processing module 126 of the source file 122 data environment such as, for example, the first data environment 102 (step 204). The native data processing module 126 includes a parquet converter module 128, a validation module 130, and a metadata capture module 132. Step 204 includes capturing a source file metadata 134 by the metadata capture module 132. In various embodiments, the source file metadata 134 may include, for example, number of columns transferred, size of files, file paths, data type, data structure, user information, start and end timestamps of the transfer, component status, transfer status, predicted transfer time and/or the like. The system may store the source file metadata 134 in the metadata database 118. Step 204 includes updating a status dashboard with a process status and a module status based on the process step and active module. For example, the process status may be "prework" and the module status may be "metadata capture".

The native data processing module 126 may apply a parquet conversion function to the source file 122 to generate a parquet file 137 (step 206). In response to generating the parquet file, the native data processing module 126 may submit a migration job to the workflow scheduler 114 via the migration API service 112 (step 208). The migration job may include the source file metadata 134 and the parquet file 137. Step 208 includes updating the status dashboard with a process status and a module status. For example, the process status may be "submitted" and the module status may be "parquet completed". Step 208 includes storing the source file metadata to the metadata database 118. In various embodiments, the workflow scheduler 114 includes a DAG generator 136 and a DAG executor 138. In response to receiving the migration job, the DAG generator 136 of workflow scheduler 114 may generate a native agent instruction set based on the source file metadata 134. The workflow scheduler 114 may generate the native agent instruction set based on a pre-defined template which may comprise configurable steps to suit various modules in the native environment. In various embodiments, the native agent instruction set includes a schedule of operations conducted by a native agent to affect a migration of the source file to the target endpoint (e.g., external data environment 106). The DAG generator may pass the native agent instruction set to a DAG executor 138 which, in response, may start one or more modules of the native agent 120 based on the schedule of operations in the instruction set.

In various embodiments, the DAG executor 138 may start a pre-work module 140 of the native agent 120 (step 210). Step 210 includes updating the status dashboard with a process status and a module status. For example, the process status may be "in progress" and the module status may be "prework in process". The pre-work module 140 may format the source data for a database 107 of the target environment to generate a target file and to update the module status to "prework completed" (step 212). In various embodiments, the pre-work module 140 may create intermediate staging directories where the native agents may write intermediate data and/or logs. The pre-work module 140 may update the module status. The pre-work module 140 may change or alter permissions on intermediate data to system ID and, in this regard, may enable user specific access controls and/or restrictions to the data. In various embodiments, the pre-work module 140 may have contextual security permissions and may have limited super user privileges to operate within the director of a parquet file and, thereby, the pre-work module may make changes to the file permissions. In this regard, the various systems and modules in communication with the pre-work module 140 may continue further data operations in a secure manner.

The DAG executor 138 may start a sensitive data element check module 142 of the native agent 120 (step 214). The sensitive data element check module 142 may search the target file for Personally Identifiable Information (PII) such as, for example, card member numbers, social security numbers, etc. (i.e., a sensitive data element). The sensitive data element check module 142 may generate an alert in response to the PII in the target file and update the module status to "PII check completed" (step 216). In various embodiments, if PII is detected within a file, an alert may be generated and the transfer process may be put on hold and the system may set the module status to "PII check failed". The process may halt in response to detecting the PII and await an approved transfer command. In response to receiving the approved transfer command, the system may proceed with the migration process (i.e. proceed to step 218). The DAG executor 138 may start a data movement module 144 of the native agent 120 (step 218).

The data movement module 144 may package and pass the target file to a data mover module 116 of the migration service 108. Step 218 may include updating the module status to "DM box move in progress". In response to receiving the target file, the native agent of data mover module 116 of the migration service 108 may pass the target file to the database 107 of the external data environment 106 (step 220). Step 220 includes updating the module status to "DM box move completed". The system may update the module statues once the data mover module 116 completes the transfer. The system may determine a success or a failure of target file migration to the external data environment 106 (step 222). In response to determining a failure, the system may update the process status to "transfer failed" and the module status to "public cloud movement failed" (step 224). In response to determining a success, the system may update process status to "transfer completed" and the module status to "public cloud movement successful" (step 226).

Figure 3A:
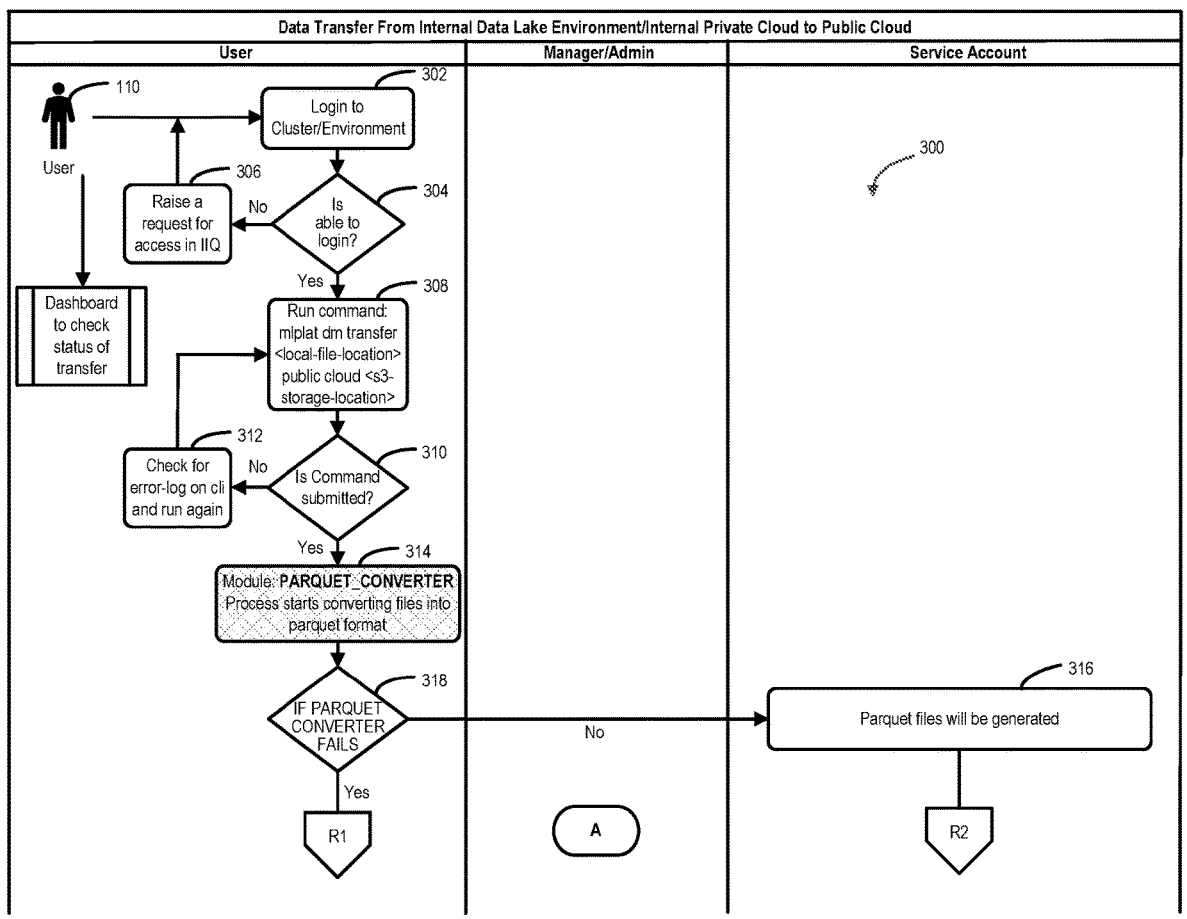
FIG. 3A illustrates a process for data migration between a first data environment and a second data environment in a system for data migration, in accordance with various embodiments.
Figure 3B:
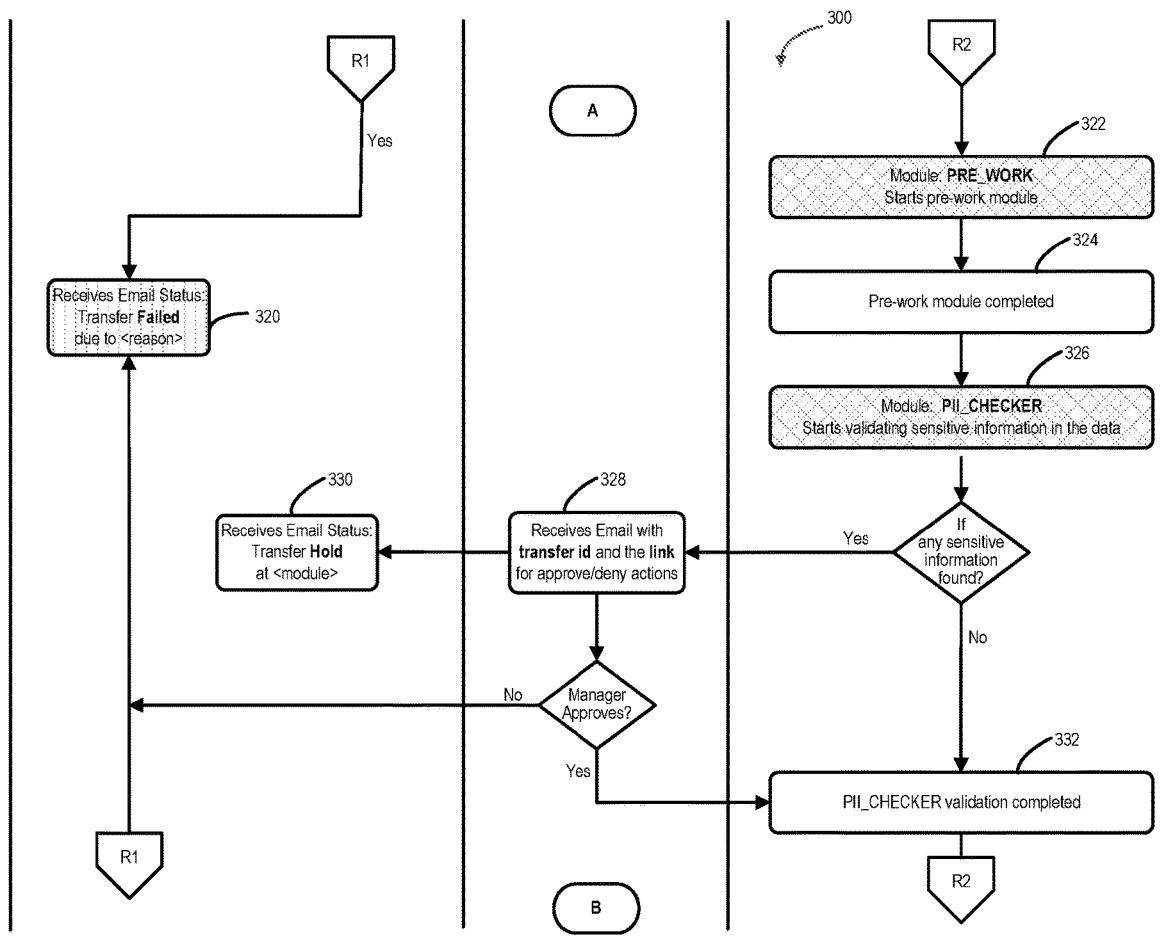
FIG. 3B illustrates a continuation of a process for data migration between a first data environment and a second data environment in a system for data migration, in accordance with various embodiments.
Figure 3C:
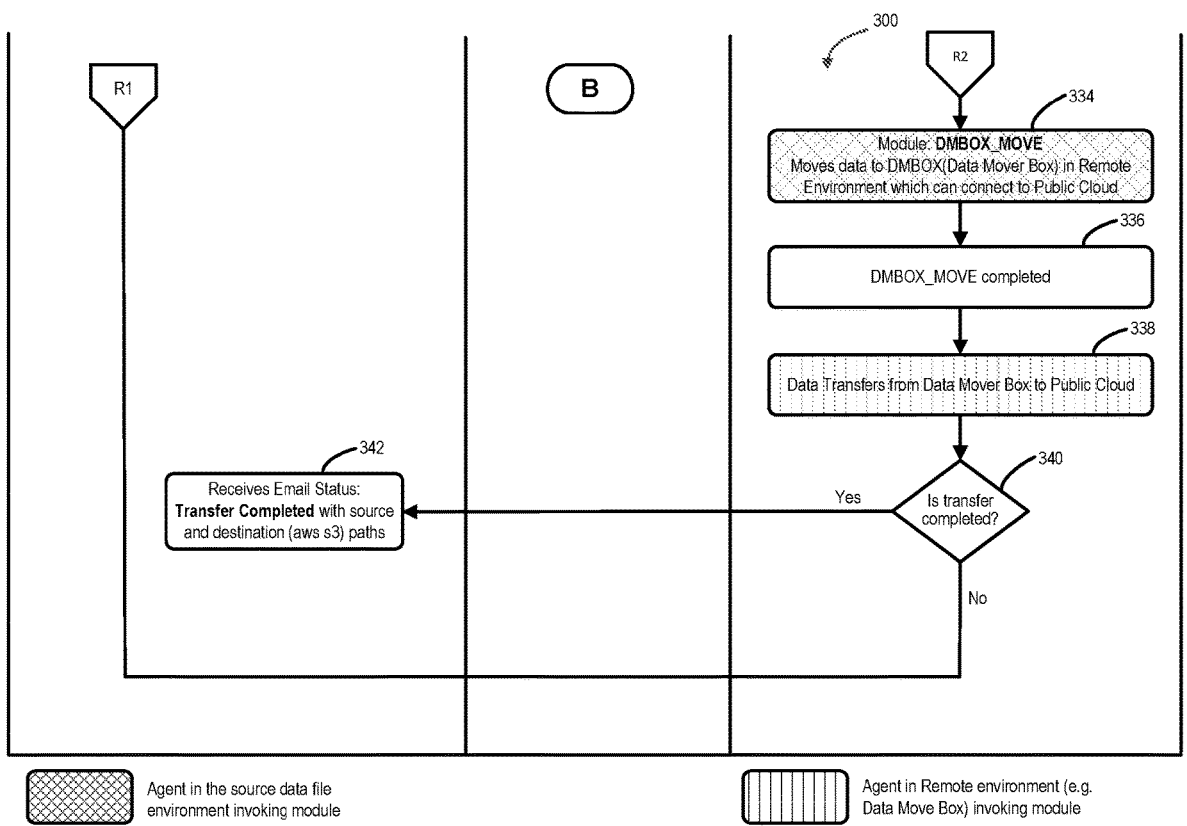
FIG. 3C illustrates a continuation of a process for data migration between a first data environment and a second data environment in a system for data migration, in accordance with various embodiments.

In various embodiments and with additional reference to FIGS. 3A through 3C, a process 300 (e.g., in system 100) for data migration between a first data environment and a second data environment is illustrated. User 110 may submit a login request comprising user credentials to an internal data environment of system 100 such as the first data environment 102 and/or the second data environment 104 (step 302). The system may determine access to the migration service 108 based on the user credentials (step 304). In response to an invalid user credential, the system may deny access to system 100 and generate an access request (step 306). In response to a valid user credential, the system may receive a migration request including a source file location and a target file location via the command line interface 124 (step 308). The system may check the migration request for errors such as, for example, a syntax error (step 310). In response to determining an error, the system may prompt the user to reenter the migration request (step 312). In response to the migration request, the system may start a parquet file conversion process (step 314). The parquet file conversion process may generate a parquet file set based on the target file location (step 316)

In various embodiments, the system may check for errors in the parquet file conversion process and/or the parquet file set (step 318). In response to an error in at least one of the parquet file conversion process or the parquet file set, the system may start an error reporting process (step 320). The error reporting process may generate an email to the user comprising an error description related to the error in at least one of the parquet file conversion process or the parquet file set. In various embodiments, any of the modules and components of the system invoked by a native agent may be configured to report successes and error codes which may be configured to trigger a module status update. The workflow scheduler may monitor the module status reporting during the transfer process and may be configured to proceed to the next module where modules report successes or terminate jobs where the current module reports failures. The system may start a prework process in response to generating the parquet file set (step 322). The system may generate a post-work file set based on the parquet file set (step 324). The system may search the post-work file set for PII (step 326). In response to finding PII within the post-work file set, the system may generate a PII hold email comprising an approval link and enter a hold state (step 328). The system may prompt the user 110 with a status hold message (step 330). In various embodiments, the system may receive a PII deny message and, in response, may start the error reporting process (step 320). The error reporting process may generate a message such as, for example, an email to the user comprising an error description related to the PII deny message.

In various embodiments, the system may receive a PII approved message (i.e., an approval message), and in response, exit the hold state (step 332). The system may start a first transfer process and pass the post-work file from the internal data environment to an intermediate data environment (step 334). Step 334 may include, for example, instructing the native agent 120 of the first data environment 102 to pass a file to the migration service 108. In various embodiments, the system may perform an error checking of the post-work file (step 336). The system may start a second transfer process and pass the post-work file from the intermediate data environment to an external data environment defined by the target file location (step 338). Step 338 may include, for example, passing the file from the migration service to the external data environment 106 or the second data environment 104. In various embodiments, the system may determine an error status of the second transfer process (step 340). In response to determining an error of the second transfer process, the system may start the error reporting process step 320. The system may generate an email based on the error status and the migration request (step 342). For example, an email may be sent to a system user account originating the transfer request and/or to a support team. The email may comprise a unique request ID, a user name, a process start time and a process end time, a log path, a data staging path location, a module ID for any failed module, and/or any other such data. In this regard, the system may tend to enable debugging of failures in an accelerated manner.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like, Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, pop-up WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a stand-alone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI' software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify look-up, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

What is claimed is:

1. A method, comprising:
    receiving, by a computer-based system, a migration request for migrating financial institution data from a first data environment to a second data environment, the migration request comprising a source file path and a target file location, the first data environment being associated with a private network and the second data environment being associated with a public network;
    capturing, by the computer-based system, source file metadata based at least in part on the source file path and the migration request;
    converting, by the computer-based system, a source file associated with the migration request to a parquet file using a parquet conversion function;
    identifying, by the computer-based system, personally identifiable information comprising at least a transaction account member number in the parquet file; and
    in response to receiving an approval to migrate the financial institution data from the first data environment to the second data environment from a user associated with the personally identifiable information:
        transferring, by the computer-based system, the converted source file from the first data environment to an intermediate data environment via a first transfer process, the intermediate data environment being associated with the private network; and
        transferring, by the computer-based system, the converted source file from the intermediate data environment to the second data environment via a second transfer process.

2. The method of claim 1, further comprising generating, by the computer-based system, a native agent instruction set based at least in part on the source file metadata and a predefined template associated with the first data environment.

3. The method of claim 2, further comprising conducting, by the computer-based system, a schedule of operations based at least in part on the native agent instruction set via a native agent of the first data environment.

4. The method of claim 1, further comprising searching, by the computer-based system, the parquet file for a sensitive data element, the sensitive data element comprising the personally identifiable information, and the personally identifiable information being identified in response to searching the parquet file, and generating a message in response to the sensitive data element, the message comprising an approval link for approving a migration of the financial institution data.

5. The method of claim 4, further comprising receiving, by the computer-based system, an approval message and exiting a hold state.

6. The method of claim 1, further comprising updating, by the computer-based system, a status dashboard with at least one of a process status and a module status.

7. The method of claim 1, wherein the source file metadata comprises at least one of a number of columns transferred, user information, one or more timestamps associated with a start or an end of a transfer, or a predicted transfer time.

8. A system comprising:
    a processor; and
    a tangible, non-transitory memory configured to communicate with the processor, the tangible, non-transitory memory having instructions stored thereon that, in response to execution by the processor, cause the processor to perform operations comprising:
    receiving, by the processor, for migrating financial institution data from a first data environment to a second data environment, the migration request comprising a source file path and a target file location, the first data environment being associated with a private network and the second data environment being associated with a public network;
    capturing, by the processor, source file metadata based on the source file path and the migration request;
    converting, by the processor, a source file associated with the migration request to a parquet file using a parquet conversion function;
    identifying, by the processor, personally identifiable information comprising at least a transaction account member number in the parquet file; and
    in response to receiving an approval to migrate the financial institution data from the first data environment to the second data environment from a user associated with the personally identifiable information:
        transferring, by the processor, the converted source file from the first data environment to an intermediate data environment via the first transfer process; and transferring, by the processor, the converted source file from the intermediate data environment to the second data environment via a second transfer process.

9. The system of claim 8, further comprising generating, by the processor, a native agent instruction set based on the source file metadata and a predefined template associated with the first data environment.

10. The system of claim 9, further comprising conducting, by the processor, a schedule of operations based on the native agent instruction set via a native agent of the first data environment.

11. The system of claim 8, further comprising searching, by the processor, the parquet file for a sensitive data element, the sensitive data element comprising the personally identifiable information, and the personally identifiable information being identified in response to searching the parquet file, and generating a message in response to the sensitive data element, the message comprising an approval link for approving a migration of the financial institution data.

12. The system of claim 11, further comprising receiving, by the processor, an approval message and exiting a hold state.

13. The system of claim 8, further comprising updating, by the processor, a status dashboard with at least one of a process status and a module status.

14. The system of claim 8, wherein the source file metadata comprises at least one of a number of columns transferred, user information, one or more timestamps associated with a start or an end of a transfer, or a predicted transfer time.

15. An article of manufacture including a non-transitory, tangible computer readable storage medium having instructions stored thereon that, in response to execution by a computer-based system, cause the computer-based system to perform operations comprising:
   receiving, by the computer-based system, a migration request for migrating financial institution data from a first data environment to a second data environment, the migration request comprising a source file path and a target file location, the first data environment being associated with a private network and the second data environment being associated with a public network;
   capturing, by the computer-based system, source file metadata based on the source file path and the migration request;
   converting, by the computer-based system, a source file associated with the migration request to a parquet file using a parquet conversion function;
   identifying, by the computer-based system, personally identifiable information comprising at least a transaction account member number in the parquet fil; and
   in response to receiving an approval to migrate the financial institution data from the first data environment to the second data environment from a user associated with the personally identifiable information;
   transferring, by the computer-based system, the converted source file from the first data environment to an intermediate data environment via a first transfer process, the intermediate data environment being associated with the private network; and
   transferring, by the computer-based system, the converted source file from the intermediate data environment to the second data environment via a second transfer process.

16. The article of manufacture of claim 15, further comprising generating, by the computer-based system, a native agent instruction set based on the source file metadata and a predefined template associated with the first data environment.

17. The article of manufacture of claim 16, further comprising conducting, by the computer-based system, a schedule of operations based on the native agent instruction set via a native agent of the first data environment.

18. The article of manufacture of claim 15, further comprising searching, by the computer-based system, the parquet file for a sensitive data element, the sensitive data element comprising the personally identifiable information, and the personally identifiable information being identified in response to searching the parquet file, and generating a message in response to the sensitive data element, the message comprising an approval link for approving a migration of the financial institution data.

19. The article of manufacture of claim 18, further comprising receiving, by the computer-based system, an approval message, exiting a hold state, and updating a status dashboard with at least one of a process status and a module status.

20. The article of manufacture of claim 15, wherein the source file metadata comprises at least one of a number of columns transferred, user information, one or more timestamps associated with a start or an end of a transfer, or a predicted transfer time.

* * * * *